(12) United States Patent
Hayfield et al.

(10) Patent No.: US 6,471,217 B1
(45) Date of Patent: Oct. 29, 2002

(54) SEALING ASSEMBLY

(75) Inventors: John Frederick Hayfield; Eric Lee Ryba, both of San Diego, CA (US)

(73) Assignee: CryoGen, Inc., San Diego, CA (US)

( * ) Notice: Subject to any disclaimer, the term of this patent is extended or adjusted under 35 U.S.C. 154(b) by 0 days.

(21) Appl. No.: 09/642,475

(22) Filed: Aug. 18, 2000

(51) Int. Cl.⁷ ............................................. F16L 17/00
(52) U.S. Cl. .................... 277/602; 277/620; 285/124.1; 285/124.4
(58) Field of Search ........................... 285/124.1, 124.4, 285/349, 350; 277/602, 608, 613, 620

(56) References Cited

U.S. PATENT DOCUMENTS 3,809,413 A  *  5/1974  Boisserand .............. 285/124.1
5,120,092 A  *  6/1992  Gorog et al. ................ 285/353
5,655,794 A  *  8/1997  Sell .......................... 285/124.1

* cited by examiner

Primary Examiner—Anthony Knight
Assistant Examiner—Enoch E Peavey
(74) Attorney, Agent, or Firm—Gerald W. Spinks

(57) ABSTRACT

A sealing assembly for attaching pliable tubes to rigid connecting members, for high pressure, low temperature service, which seals by compressing a sealing wafer around the pliable tubes. The pliable tubes pass through holes in the sealing wafer. As the wafer seal is axially compressed, the wafer seal is restrained against radial expansion, thereby exerting an inward radial pressure on the holes through the wafer seal to cause an hermetic seal between the wafer seal and the pliable tubes. A swage bushing can be used, with swage tubes that are swaged onto the pliable tubes by a swage clamp, for the purpose of axially restraining the pliable tubes.

18 Claims, 7 Drawing Sheets

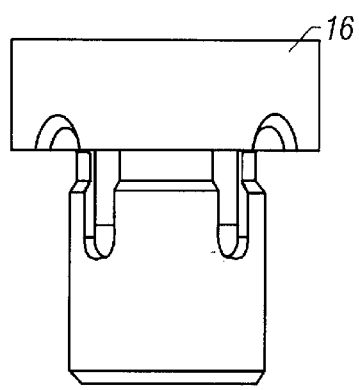 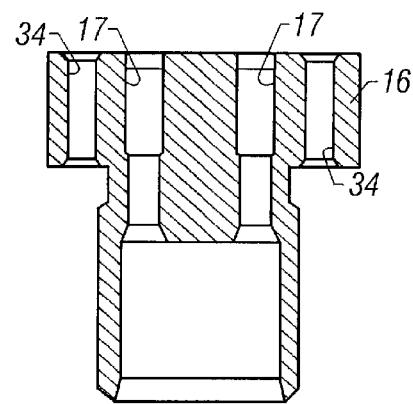
FIG. 7A             FIG. 7B
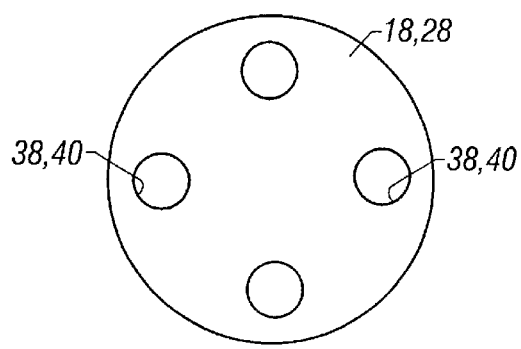 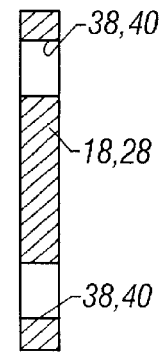
FIG. 8A             FIG. 8B

SEALING ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is in the field of devices used to connect pliable tubing to non-pliable mating devices or tubing.

2. Background Art

Many devices, especially in the medical field, utilize pliable tubing such as polymer tubing to conduct fluids, because of the flexibility of pliable tubing, which promotes ease of manipulation by the user. Specifically, in the field of cryosurgical probes, a refrigeration device such as a compressor typically delivers a cryogenic fluid for use in cooling a probe, which in turn is used to freeze target areas of biological tissue. The compressor is typically too large and heavy to be moved around by the surgeon in manipulating the probe. Therefore, flexible tubes may be used to conduct the cryogenic fluid from the compressor to the probe.

This requires that the polymer tubing be connected to the compressor at the proximal end, and to the probe at the distal end. These connections must be fluid tight, they must be reliable, and at least at the probe, they must be as compact as possible. Often, more than one polymer tube is required, for example, to provide a cryogen supply, a cryogen return, a saline solution supply, and one or more suction lines. When multiple polymer tubes are implemented, it is even more important for the connection assembly at the probe to be as compact as possible. Since the cryogenic fluid may be at a very low temperature and a very high pressure, the connection assembly must be able to provide a compact, reliable, fluid tight seal at very low temperature and high pressure.

Some known devices in the prior art attempt to seal these connections to polymer tubing by using epoxy or some other type of adhesive. These devices typically are difficult to apply and require some curing time, thereby adding to the expense of the assembly procedure.

Other known devices utilize one or more o-rings to accomplish a seal. These devices usually must be manufactured to precise tolerances to be effective, making them more expensive. Further, o-ring seals typically only seal over a relatively small portion of the area required for their implementation, making them subject to relatively high leakage for a given size.

Still other known devices attempt to accomplish a seal by swaging a metal member to the polymer tubing. Such swaging typically deforms the polymer tubing by a significant amount, thereby substantially altering the fluid flow characteristics of the tubing. Further, even when the metal member is swaged enough to significantly deform the polymer tube, the resulting joint is subject to substantial leakage, especially at high pressure and low temperature.

It would be beneficial to provide a compact sealing assembly which can join one or more pliable tubes to a rigid, or non-pliable, member without significant deformation of the pliable tube, without manufacturing or assembly problems, and without appreciable leakage at high pressures and cryogenic temperatures.

BRIEF SUMMARY OF THE INVENTION

The present invention utilizes a compressible sealing wafer, which is compressed between two rigid components to result in a radially inward compression around one or more pliable tubes, to accomplish an hermetic seal around the pliable tubes. The compressible wafer seal has one or more holes therethrough for the passage of one or more pliable tubes, such as polymer tubes. The two rigid components define a cavity which is sized and shaped to axially compress the thickness of the wafer seal, while constraining the wafer seal to prevent it from expanding radially outwardly. This causes the wafer seal to tend to displace in an inward direction toward the centerlines of the holes of the seal, in turn exerting a radially inward pressure on the polymer tubes passing through the holes in the wafer seal. This exerts sufficient sealing pressure on the peripheries of the polymer tubes without appreciably deforming the tubes, since the wafer seal is itself pliable. The pliable tubes can have backing tubes inside, to provide support for the pliable tube in resisting the inward pressure of the wafer seal.

A bushing is used as one of the two rigid components, while the other rigid component can be a compressor manifold or a coupler at the handle of a cryoprobe. One or more through holes are provided in the bushing, for the passage of one or more polymer tubes. The bushing can have one or more swage tubes aligned with these through holes, with the polymer tubes passing through the swage tubes. A swage clamp can be provided to mate with the bushing, with swage holes in the swage clamp to swage the swage tubes lightly onto the polymer tubes, for the purpose of axially stabilizing the polymer tubes, preventing them from pulling loose from the compressor manifold or the cryoprobe coupler. The pliable tubes can have backing tubes inside, to provide support for the pliable tube in resisting the inward pressure of the swage tubes. In the preferred embodiment, the bushing is placed between the swage clamp and the manifold or the coupler, with the compressible wafer seal in a cavity between the bushing and the manifold or coupler. The cavity, which constrains the compressible wafer seal, can be formed either in the bushing, or in the manifold or coupler.

The novel features of this invention, as well as the invention itself, will be best understood from the attached drawings, taken along with the following description, in which similar reference characters refer to similar parts, and in which:

BRIEF DESCRIPTION OF THE SEVERAL VIEWS OF THE DRAWINGS

FIGS. 7A and 7B show a swage clamp used in the embodiment of the present invention shown in FIG. 2; and FIGS. 8A and 8B show sealing wafers used in the present invention.

DETAILED DESCRIPTION OF THE INVENTION

Figure 1:
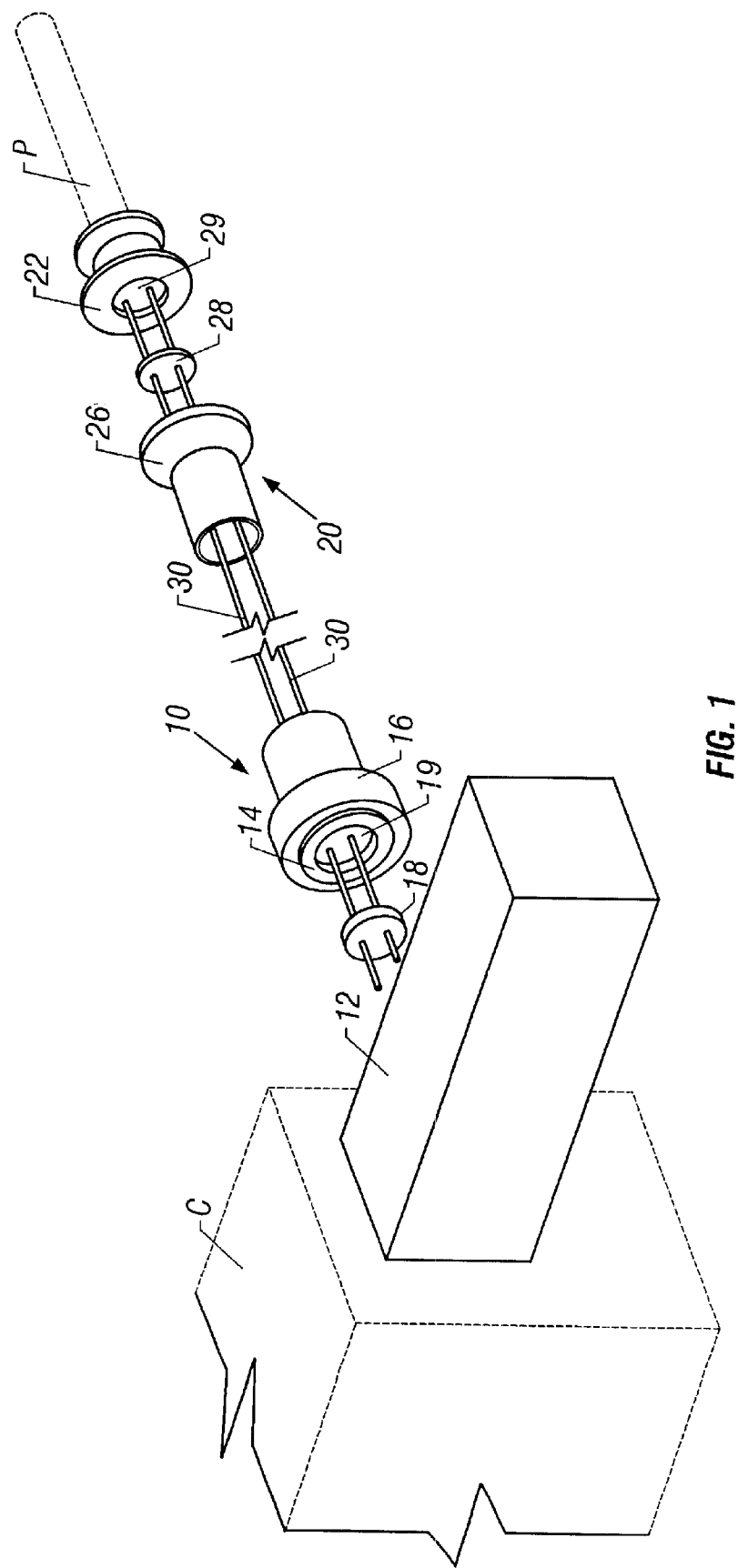
FIG. 1 is an expanded perspective view of a flexible cryogenic tube assembly, utilizing two he sealing assemblies of the present invention.

As shown in FIG. 1, the sealing assembly 10, 20 of the present invention can be utilized in a cryosurgical probe apparatus to hermetically seal the connections of one or more flexible polymer tubes 30 to a rigid connecting member. In the first embodiment, the sealing assembly 10 seals the connections of the flexible tubes 30 to a manifold 12 of a compressor unit C, while in the second embodiment, the sealing assembly 20 seals the connections of the flexible tubes 30 to a coupler 22 of a cryosurgical probe P. However, either embodiment of the present invention could be used to seal the connections at either end of the cryosurgical probe apparatus.

In the sealing assembly 10, a bushing 14 is placed adjacent to and abutting a swage clamp 16, which is then attached to a rigid connecting member such as the manifold 12. A compressible sealing wafer 18 is positioned between the manifold 12 and the bushing 14. The wafer seal 18 fits snugly into a cavity 19 in the proximal side of the bushing 14. One or more pliable tubes 30 pass through holes in the swage clamp 16, the bushing 14, and the wafer seal 18, and into the manifold 12, where a fluid flow connection is made to the compressor unit C. The manifold 12, the bushing 14, and the swage clamp 16 are rigid components, which can be manufactured from a material such as stainless steel. The wafer seal 18 can be manufactured from a compressible material such as butyl rubber. Other materials may be used which may be selected according to various application parameters, including expected pressures, temperatures, and material compatibility.

In the sealing assembly 20, a bushing 24 (not shown in this view, but shown in detail in other Figures) placed adjacent to and abutting a swage clamp 26, which is then attached to a rigid connecting member such as the coupler 22. A compressible sealing wafer 28 is positioned between the coupler 22 and the bushing 24. The wafer seal 28 fits snugly into a cavity 29 in the proximal side of the coupler 22. The basic difference between the first embodiment of the sealing assembly 10 and the second embodiment of the sealing assembly 20 is that, in the former, the seal cavity 19 is formed in the bushing 14, while in the latter, the seal cavity 29 is formed in the rigid connecting member, the coupler 22. One or more pliable tubes 30 pass through holes in the swage clamp 26, the bushing 24, and the wafer seal 28, and into the coupler 22, where a fluid flow connection is made to the probe P. The coupler 22, the bushing 24, and the swage clamp 26 are rigid components, which can be manufactured from a material such as stainless steel. The wafer seal 28 can be manufactured from a compressible material such as butyl rubber.

Figure 2:
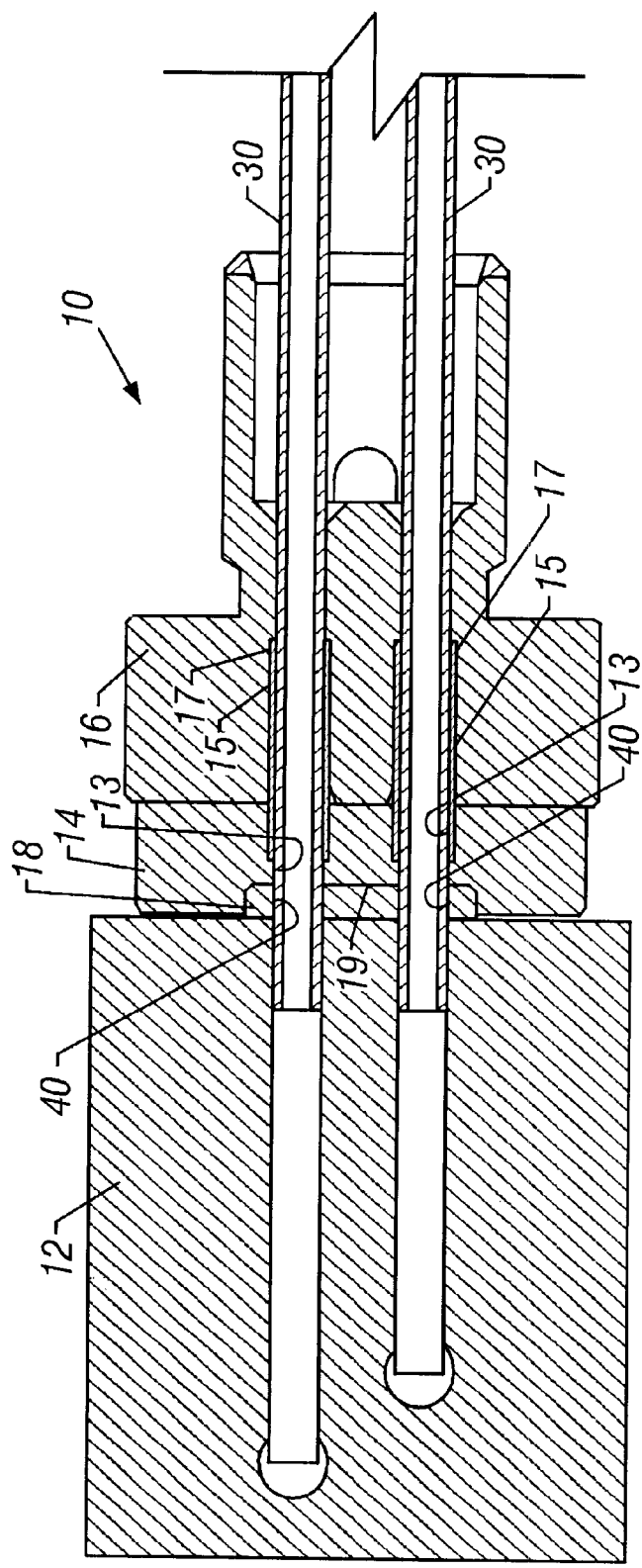
FIG. 2 is a longitudinal section view of a first embodiment of a sealing assembly according to the present invention.

As shown in more detail in FIG. 2, in the sealing assembly 10, the wafer seal 18 is contained within the seal cavity 19 in the proximal side of the bushing 14, which abuts the manifold 12. The swage clamp 16 is attached to the manifold 12 by studs or bolts (not shown), or by any other suitable means. The pliable tubes 30 pass through holes 17 in the swage clamp 16, through holes 13 in the bushing 14, through holes 40 in the wafer seal 18, and into the manifold 12. The wafer seal 18 has substantially the same diameter as the seal cavity 19, but the thickness of the wafer seal 18 is greater than the axial depth of the seal cavity 19. Therefore, as the swage clamp 16 is bolted to the manifold 12, the swage clamp 16 forces the bushing 14 toward the manifold 12, axially compressing the wafer seal 18 into the seal cavity 19 between the bushing 14 and the manifold 12. Since the seal cavity 19 is configured to prevent radial expansion of the wafer seal 18 as the wafer seal 18 is being axially compressed, the pliable material of the wafer seal 18 exerts a radially inward pressure on the pliable tubes 30 passing through the holes 40 in the wafer seal 18. This radially inward pressure provides an hermetic seal around the pliable tubes 30, which remains effective at high pressure and low temperature. One edge of the wafer seal 18 has a radius, to promote flow of the seal material into the seal cavity 19 as the wafer seal 18 is axially compressed. Similarly, the seal cavity 19 in the bushing 14 can have a radius at its inner corner, to promote the flow of the wafer seal 18 into the cavity 19 when the wafer seal 18 is axially compressed. Backup tubes (not shown) can be provided inside the pliable tubes 30 to support the pliable tubes 30 against the sealing action.

Swage tubes 15 are welded or brazed to the bushing 14, aligning with the tubing holes 13 through the bushing 14. Therefore, the pliable tubes 30 also pass through the swage tubes 15. The holes 17 through the swage clamp 16 are not only passage holes for the pliable tubes 30, they are also swaging holes into which the swage tubes 15 are inserted. The swaging holes 17 are slightly smaller in diameter than the outside diameter of the swage tubes 15; the swaging holes 17 are chamfered or countersunk at their proximal ends to allow insertion of the swage tubes 15. As the swage tubes 15 are inserted into the swaging holes 17, the swage tubes 15 are swaged onto the pliable tubes 30 to axially stabilize the position of the pliable tubes 30. Backup tubes (not shown) can be provided inside the pliable tubes 30 to support the pliable tubes 30 against the swaging action.

Figure 3:
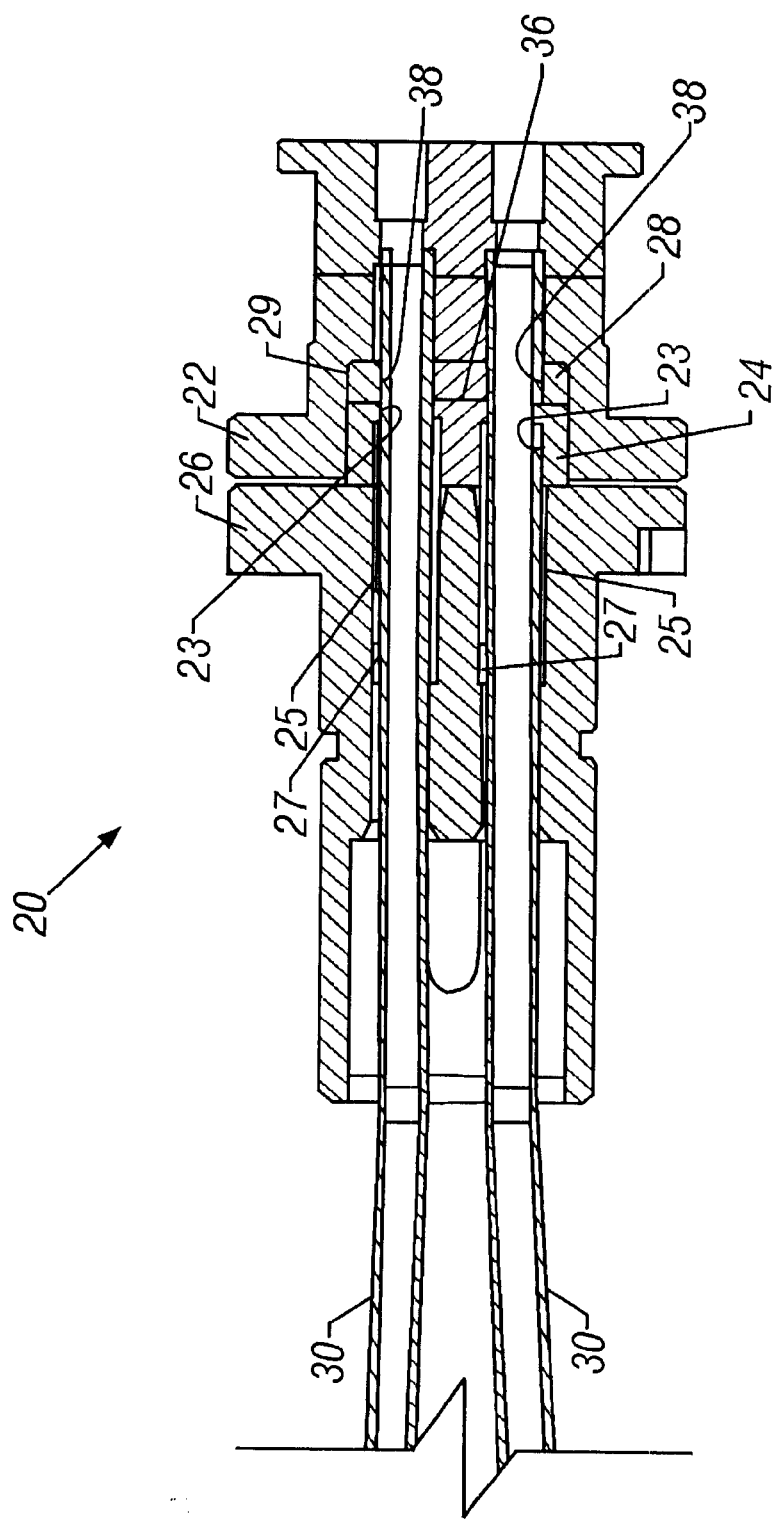
FIG. 3 is a longitudinal section view of a second embodiment of a sealing assembly according to the present invention.
Figure 4A:
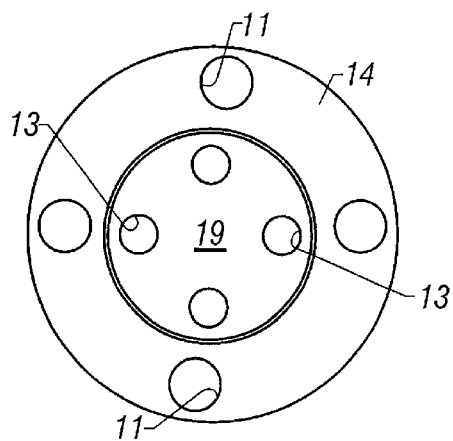
FIGS. 4A through 4D show a swage bushing used in the embodiment of the present invention in FIG. 2.
Figure 4B:
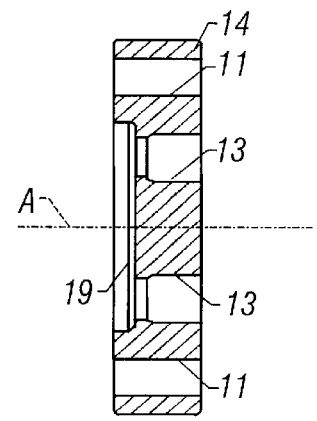
Figure 4C:
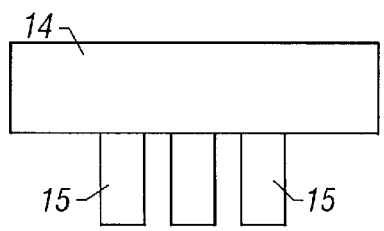
Figure 4D:
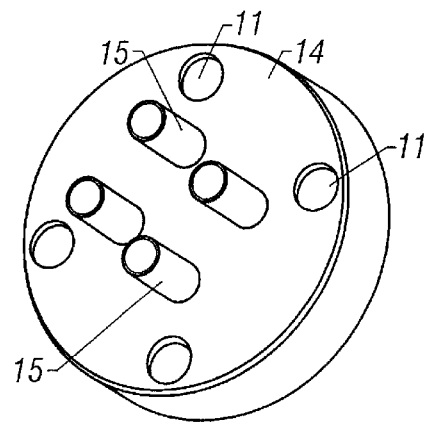

As shown in more detail in FIG. 3, in the sealing assembly 20, the wafer seal 28 is contained within the seal cavity 29 in the proximal side of the coupling 22, which abuts the swage clamp 26. The swage clamp 26 is attached to the coupling 22 by studs or bolts (not shown), or by any other suitable means. The pliable tubes 30 pass through holes 27 in the swage clamp 26, through holes 23 in the bushing 24, through holes 38 in the wafer seal 28, and into the coupling 22. The wafer seal 28 has substantially the same diameter as the seal cavity 29, but the thickness of the wafer seal 28 is greater than the axial depth of the seal cavity 29. Therefore, as the swage clamp 26 is bolted to the coupling 22, the swage clamp 26 forces the bushing 24 toward the coupling 22, axially compressing the wafer seal 28 into the seal cavity 29 between the bushing 24 and the coupling 22. Since the seal cavity 29 is configured to prevent radial expansion of the wafer seal 28 as the wafer seal 28 is being axially compressed, the pliable material of the wafer seal 28 exerts a radially inward pressure on the pliable tubes 30 passing through the holes 38 in the wafer seal 28. This radially inward pressure provides an hermetic seal around the pliable tubes 30, which remains effective at high pressure and low temperature. One edge of the wafer seal 28 has a radius, to promote flow of the seal material into the seal cavity 29 as the wafer seal 28 is axially compressed. Similarly, the seal cavity 29 in the coupler 22 can have a radius at its inner corner, to promote the flow of the wafer seal 28 into the cavity 29 when the wafer seal 28 is axially compressed. Backup tubes (not shown) can be provided inside the pliable tubes 30 to support the pliable tubes 30 against the sealing action.

Swage tubes 25 are welded or brazed to the bushing 24, aligning with the tubing holes 23 through the bushing 24. Therefore, the pliable tubes 30 also pass through the swage tubes 25. The holes 27 through the swage clamp 26 are not only passage holes for the pliable tubes 30, they are also swaging holes into which the swage tubes 25 are inserted. The swaging holes 27 are slightly smaller in diameter than the outside diameter of the swage tubes 25; the swaging holes 27 are chamfered or countersunk at their distal ends to allow insertion of the swage tubes 25. As the swage tubes 25 are inserted into the swaging holes 27, the swage tubes 25 are swaged onto the pliable tubes 30 to axially stabilize the position of the pliable tubes 30. Backup tubes (not shown) can be provided inside the pliable tubes 30 to support the pliable tubes 30 against the swaging action.

FIGS. 4A through 4D show the swage bushing 14 of the first embodiment of the sealing assembly 10 in more detail. The swage bushing 14 is essentially a flange with a seal cavity 19 in one side, and with through holes 13 for the passage of the pliable tubes 30. Bolt holes 11 can also be provided to allow the passage of bolts (not shown) for attaching the swage clamp 16 to the manifold 12. The seal cavity 19 can have a radius at its inner corner, to promote the flow of the wafer seal 18 into the cavity 19 when the wafer seal 18 is axially compressed. A plurality of swage tubes 15 can be attached to the bushing 14 by welding or brazing, with the swage tubes 15 aligning with the tube holes 13 and extending orthogonally to the surface of the bushing 14.

Figure 5A:
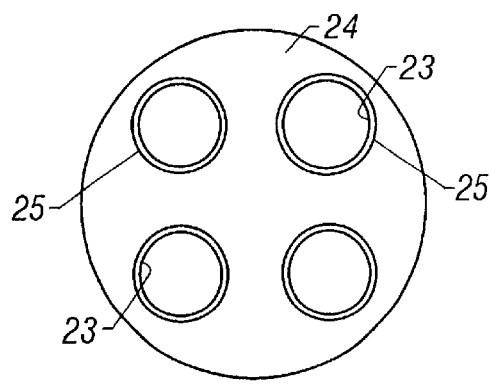
FIGS. 5A through 5C how a swage bushing used in the embodiment of the present invention shown in FIG. 3.
Figure 5B:
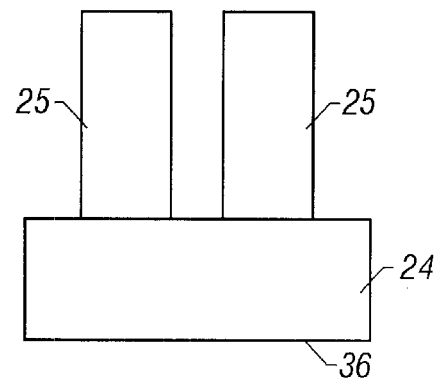
Figure 5C:
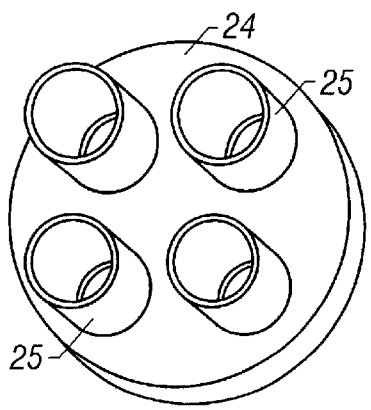
Figure 6A:
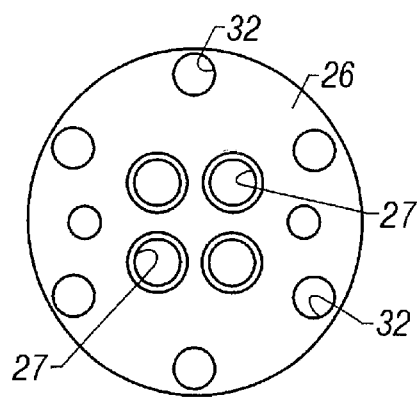
FIGS. 6A through 6D show a swage clamp used in the embodiment of the present invention shown in FIG. 3.
Figure 6B:
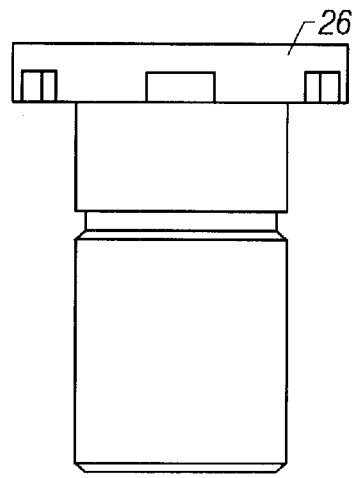
Figure 6C:
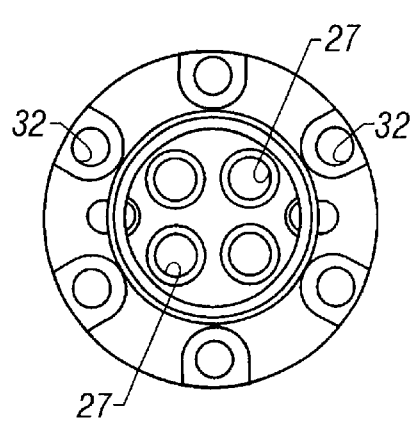
Figure 6D:
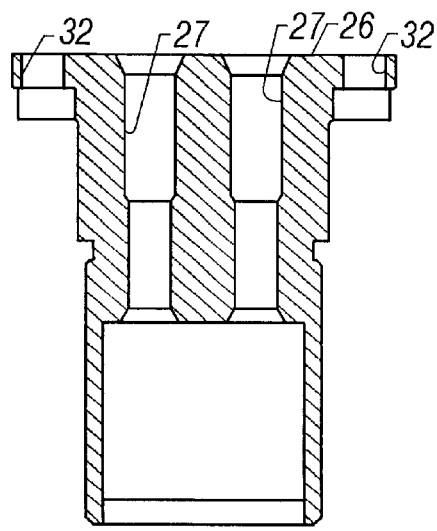

FIGS. 5A through 5C show the swage bushing 24 of the second embodiment of the sealing assembly 20 in more detail. The swage bushing 24 is essentially a flange, without a seal cavity, since in this embodiment, the seal cavity 29 is provided in the rigid connecting member, the coupler 22. The swage bushing 24 has through holes 23 for the passage of the pliable tubes 30. A plurality of swage tubes 25 can be attached to the bushing 24 by welding or brazing, with the swage tubes 25 aligning with the tube holes 23 and extending orthogonally to the surface of the bushing 24.

FIGS. 6A through 6D show the swage clamp 26 of the second embodiment of the sealing assembly 20. The swage clamp 26 consists of a flange and a barrel, with tube holes 27 being provided therethrough for the passage of the pliable tubes 30. The tube holes 27 also function as swaging holes for swaging the swage tubes 25 of the swage bushing 24 onto the pliable tubes 30. The swaging of the swage tubes 25 mechanically captures the pliable tubes 30 in their axial position. Bolt holes 32 can also be provided to allow the passage of bolts (not shown) to attach the swage clamp 26 to the coupler 22. Or, a clamping ring housing could be used, that would include a ring with an inside diameter that would slide over one side of the sealing joint and having an external thread. The other side of the housing would include an inside diameter that would slide over the opposite side of the joint. This cavity would have a threaded counterbore that, when screwed together, would provide the needed compression for sealing. The swaging holes 27 are slightly smaller in diameter than the swage tubes 25, and they are chamfered at one end, to allow for the entry of the swage tubes 25.

FIGS. 7A and 7B show the swage clamp 16 of the first embodiment of the sealing assembly 10. The swage clamp 16 consists of a flange and a barrel, with tube holes 17 being provided therethrough for the passage of the pliable tubes 30. The tube holes 17 also function as swaging holes for swaging the swage tubes 15 of the swage bushing 14 onto the pliable tubes 30. The swaging of the swage tubes 15 mechanically captures the pliable tubes 30 in their axial position. The swaging holes 17 are slightly smaller in diameter than the swage tubes 15, and they are chamfered at one end, to allow for the entry of the swage tubes 15.

FIGS. 8A and 8B show the sealing wafers 18, 28. Each wafer seal 18, 28 is a disk of compressible material such as butyl rubber. The wafer seal 18, 28 has a plurality of holes 38, 40 therethrough for passage of the pliable tubes 30. One edge of the wafer seal 18, 28 has a radius, to promote flow of the seal material into the seal cavity 19, 29 as the wafer seal is axially compressed. The seal cavity 19, 29, into which the wafer seal 18, 28 fits, can have a radius at its inner corner, to promote the flow of the wafer seal 18, 28 into the cavity 19, 29 when the wafer seal 18, 28 is axially compressed. The other edge of the wafer seal 18, 28 has a sharp edge, to promote sealing against a flat surface of the member against which it abuts, such as the manifold 12 or the bushing 24.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

We claim:

1. A sealing assembly for attaching a pliable tube to a rigid member for fluid flow, comprising:

a rigid connecting member;

a rigid bushing adjacent to said connecting member, with a cavity between said bushing and said connecting member, said bushing having at least one tubing hole therethrough for passage of at least one pliable tube; and a compressible wafer seal within said cavity, said wafer seal having at least one tubing hole therethrough for passage of at least one pliable tube;

wherein said cavity is configured to compress said wafer seal between said bushing and said connecting member, thereby decreasing the diameter of said at least one tubing hole through said wafer seal to seal said wafer seal around said at least one pliable tube.

2. The sealing assembly recited in claim 1, wherein said bushing is adapted for attachment to said connecting member.

3. The sealing assembly recited in claim 1, wherein:

said wafer seal has a thickness greater than the axial depth of said cavity;

said compression of said wafer seal is axial compression; and said cavity is configured to prevent radial expansion of said wafer seal within said cavity upon said axial compression of said wafer seal.

4. The sealing assembly recited in claim 1, wherein said cavity is formed within said bushing.

5. The sealing assembly recited in claim 1, wherein said cavity is formed within said connecting member.

6. The sealing assembly recited in claim 1, wherein said connecting member comprises a manifold.

7. The sealing assembly recited in claim 1, wherein said connecting member comprises a tubing coupler.

8. A sealing assembly for attaching a pliable tube to a rigid member for fluid flow, comprising:

a rigid connecting member;

a rigid bushing adjacent to said connecting member, with a cavity between said bushing and said connecting member, said bushing having at least one tubing hole therethrough for passage of at least one pliable tube;

a compressible wafer seal within said cavity, said wafer seal having at least one tubing hole therethrough for passage of at least one pliable tube;

a rigid swage clamp attached to said connecting member with said bushing between said swage clamp and said connecting member, said swage clamp having at least one tapered swaging hole therethrough; and at least one swage tube extending from said bushing, said at least one swage tube being aligned with said at least one tubing hole in said bushing for passage of said at least one pliable tube through said swage tube, said at least one swage tube being positioned within said at least one swaging hole in said swage clamp upon said attachment of said swage clamp to said connecting member;

wherein said cavity is configured to compress said wafer seal between said bushing and said connecting member, thereby decreasing the diameter of said at least one tubing hole through said wafer seal to seal said wafer seal around said at least one pliable tube; and wherein said at least one tapered swaging hole in said swage clamp is configured to swage said at least one swage tube to a decreased diameter upon attachment of said swage clamp to said connecting member, thereby capturing said at least one pliable tube within said at least one swage tube.

9. A sealing assembly for attaching a pliable tube to a rigid member for fluid flow, comprising:

a rigid connecting member;

a rigid swage clamp adapted for attachment to said connecting member, said swage clamp having at least one tapered swaging hole therethrough;

a rigid swage bushing between said swage clamp and said connecting member, with a cavity between said swage bushing and said connecting member, said swage bushing having at least one tubing hole therethrough for passage of at least one pliable tube;

at least one swage tube extending from said swage bushing, said at least one swage tube being aligned with said at least one tubing hole in said swage bushing for passage of said at least one pliable tube through said swage tube, said at least one swage tube being positioned within said at least one swaging hole in said swage clamp upon attachment of said swage clamp to said connecting member; and a compressible wafer seal within said cavity, said wafer seal having at least one tubing hole therethrough for passage of at least one pliable tube;

wherein said at least one tapered swaging hole in said swage clamp is configured to swage said at least one swage tube to a decreased diameter upon attachment of said swage clamp to said connecting member, thereby capturing said at least one pliable tube within said at least one swage tube; and wherein said cavity is configured to compress said wafer seal between said bushing and said connecting member upon attachment of said swage clamp to said connecting member, thereby decreasing the diameter of said at least one tubing hole through said wafer seal to seal said wafer seal around said at least one pliable tube.

10. The sealing assembly recited in claim 9, wherein said swage bushing is adapted for attachment to said connecting member.

11. The sealing assembly recited in claim 9, wherein:

said wafer seal has a thickness greater than the axial depth of said cavity;

said compression of said wafer seal is axial compression; and said cavity is configured to prevent radial expansion of said wafer seal within said cavity upon said axial compression of said wafer seal.

12. The sealing assembly recited in claim 9, wherein said cavity is formed within said swage bushing.

13. The sealing assembly recited in claim 9, wherein said cavity is formed within said connecting member.

14. The sealing assembly recited in claim 9, wherein said connecting member comprises a manifold.

15. The sealing assembly recited in claim 9, wherein said connecting member comprises a tubing coupler.

16. A sealing assembly for attaching a pliable tube to a rigid member for fluid flow, comprising:

a rigid connecting member;

a rigid bushing having a face adjacent to a face of said connecting member, with a cavity formed extending into either said face of said bushing or said face of said connecting member, said bushing having at least one tubing hole therethrough for passage of at least one pliable tube; and a compressible wafer seal within said cavity, said wafer seal having at least one tubing hole therethrough for passage of at least one pliable tube;

wherein said cavity is configured to compress said wafer seal between said bushing and said connecting member, thereby decreasing the diameter of said at least one tubing hole through said wafer seal to seal said wafer seal around said at least one pliable tube.

17. A sealing assembly for attaching a plurality of pliable tubes to a rigid member for fluid flow, comprising:

a rigid connecting member;

a rigid bushing adjacent to said connecting member, with a cavity between said bushing and said connecting member, said bushing having a plurality of tubing holes therethrough for passage of a plurality of pliable tubes; and a compressible wafer seal within said cavity, said wafer seal having a plurality of tubing holes therethrough for passage of a plurality of pliable tubes;

wherein said cavity is configured to compress said wafer seal between said bushing and said connecting member, thereby decreasing the diameter of each of said plurality of tubing holes through said wafer seal to seal said wafer seal around each of said plurality of pliable tubes.

18. A sealing assembly for attaching a plurality of pliable tubes to a rigid member for fluid flow, comprising:

a rigid connecting member;

a rigid bushing having a face adjacent to a face of said connecting member, with a cavity formed extending into either said face of said bushing or said face of said connecting member, said bushing having a plurality of tubing holes therethrough for passage of a plurality of pliable tubes; and a compressible wafer seal within said cavity, said wafer seal having a plurality of tubing holes therethrough for passage of a plurality of pliable tubes;

wherein said cavity is configured to compress said wafer seal between said bushing and said connecting member, thereby decreasing the diameter of each of said plurality of tubing holes through said wafer seal to seal said wafer seal around each of said plurality of pliable tubes.

* * * * *